United States Patent Office 3,028,410
Patented Apr. 3, 1962

3,028,410
SYNTHESIS OF POLYHYDROXY AROMATIC COMPOUNDS
William F. Zimmer, Jr., Le Roy, N.Y., assignor to Hooker Chemical Corporation, Niagara Falls, N.Y., a corporation of New York
No Drawing. Filed June 26, 1958, Ser. No. 744,684
7 Claims. (Cl. 260—461)

This invention relates to a new method for making polyhydroxy aromatic compounds and especially hydroxyphenolic compounds such as:

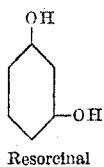

Resorcinal and

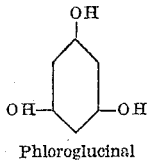

Phloroglucinal from corresponding phenolic starting materials such as:

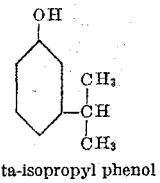

Meta-isopropyl phenol and

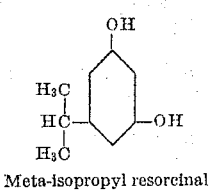

Meta-isopropyl resorcinal

Several approaches for doing this were thought of and tried before the successful method of this invention was discovered. One approach tried, for example, involved the attempted peroxidation of the meta-isopropyl phenol to the hydroperoxide to be followed by cleavage to resorcinol. It was found, however, that this could not be accomplished due to the very efficient inhibition of the peroxidation reaction by the phenolic OH group.

It is accordingly an object of this invention to produce polyhydroxy aromatic compounds and especially hydroxyphenolic compounds; such as, resorcinol and phloroglucinol. It is another object of this invention to produce such compounds by the employment of a new and useful synthetic route. It is a further object of this invention to synthesize such polyhydroxy aromatic compounds by overcoming or avoiding the aforesaid inhibition of the peroxidation reaction. It is a further object of this invention to produce such polyhydroxy aromatic compounds in a practicable manner. It is yet another object of this invention to achieve a new method for synthesizing aldehydes and ketones. It is still another object of this invention to provide a new method for preparing intermediates; such as, resorcinol mono esters or mono ethers, or phloroglucinyl diesters or diethers. It is still a further object of this invention to prepare new peroxidized intermediate compounds. Still other objects will be apparent from a consideration of the following.

It has been found that the foregoing objectives may be achieved by making the hydroxy constituent of the starting aromatic compound ineffective as inhibitors by blocking them in the form of derivatives; such as, phosphates, esters or ethers. It has been further found that this procedure is effective to accomplish all of the aforesaid objectives not only for meta substituted hydroxy aromatics but for para and ortho isomers as well.

It has been further found that said derivatives can then be efficiently peroxidized and the peroxidation products cleaved to form the desired product. The chain of reactions may be illustrated as follows:

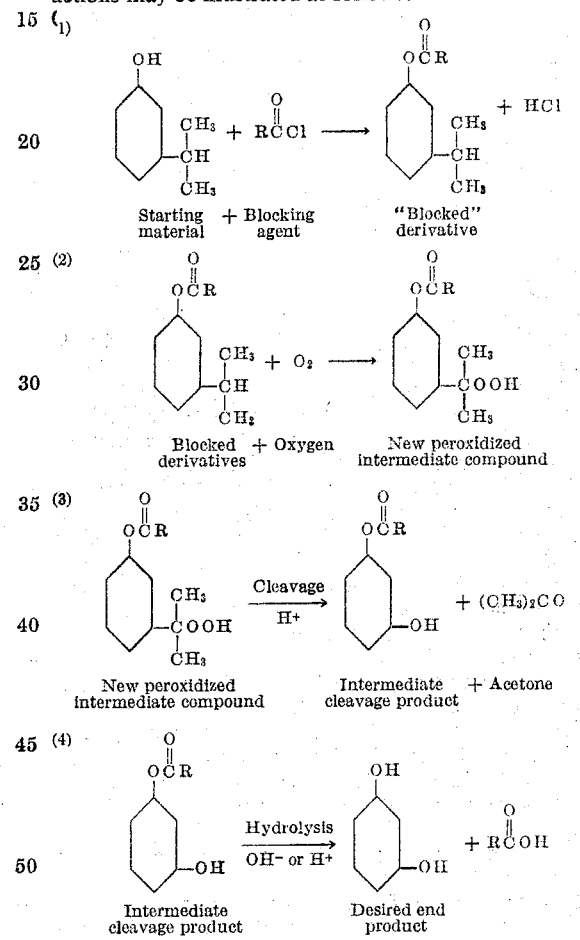

Among the starting materials which may be employed in the practice of this invention and which will undergo the reactions depicted herein are: 3,5-diisopropylphenol; m-isopropylphenol; 2,4-diisopropylphenol; 2,6-diisopropylphenol; p-isopropylphenol; 3,5-diethylphenol; 3,5-dimethylphenol; 3-ethyl-5-isopropylphenol; 2-methyl-4-isopropylphenol; 3,5-sec-butylphenol; etc. The peroxidizable groups may be located in the meta, para or ortho positions and they comprise any alkyl group containing a hydrogen atom alpha to the aromatic ring. There may be more than one such alkyl group present and if there is more than one, they may be peroxidized separately or simultaneously. The term hydroxy aromatic compound as employed in this invention is intended to embrace not only phenolic starting materials, which possess only one benzene ring, but also di and tri nuclear hydroxy aromatic starting compounds.

Before these hydroxy aromatic compounds are peroxidized they must first be converted into phosphates, ethers or esters and the free hydroxy aromatic compound content reduced to less than one percent or to substantially zero percent. As previously stated this is absolutely essential to the success of the process, for if this is not done the desired peroxidation reaction cannot take place. The reducing of the hydroxy aromatic compound may be accomplished by chemically reacting the starting material to completion by the reaction techniques described in this invention or, if this is not possible or practicable, the residual hydroxy containing compounds may be removed by any suitable separation technique, such as by recrystallization, extraction, adsorption, etc. Blocking agents which react with the hydroxy constituent of these compounds and which are effective to yield a blocked product capable of being peroxidized include phosphorus oxychloride, phosphoric acid, phosphorus pentoxide, acetic anhydride and other alpihatic and aromatic anhydrides; acetyl chloride and other aliphatic and aromatic acid halides; acetic acid and other aliphatic and aromatic acids; dimethyl sulfate plus sodium hydroxide; combinations of basic materials such as sodium or potassium hydroxide and aromatic or aliphatic halides such as methyl chloride or bromobenzene.

Once the starting materials have been effectively blocked through the foregoing reaction with the hydroxyl constituent, the blocked derivatives may then be peroxidized at the alkyl group containing a hydrogen atom alpha to the aromatic ring constitutent, the oxidation taking place at this site only. The thus peroxidized compounds obtained are then further characterized by their ability to undergo cleavage and hydrolysis whereby both the blocked site constituent and the peroxidized alkyl site constituent become hydroxyl constituents. It is evident from Equations 3 and 4 that the peroxide cleavage reaction can be operated independently of the removal of the blocking agent if desired. In other words, it is not necessary to cleave all the way to the final polyhydroxy aromatic compound. This is advantageous particularly when the intermediate blocked aromatic hydroxy compound possesses independent utility. The peroxidized compounds obtained prior to cleavage are believed to be new and are characterized by their method of preparation as well as by their subsequent cleavage to known and expected materials and also by their ability to oxidize the iodide ion to iodine.

The peroxidation step may be carried out in any convenient manner such as by bulk oxidation or oxidation in solution and over a wide temperature range but preferably between 60 and 180 degrees centigrade. Hydroperoxides and alkaline catalysts, such as sodium hydroxide, are useful in facilitating the intermediate peroxidation reaction.

The following examples will serve to further illustrate the invention.

Examples 1 to 13 illustrate the preparation of oxidizable derivatives of phenols, with the name of the derivative being set opposite the example number. These examples correspond to reaction step (1) of the chain of reactions.

*Example 1.—The Preparation of 3,5-Diisopropylphenyl Benzoate*

One part of sodium hydroxide was dissolved in water to form a 10% solution. To this, in a reaction vessel, was added 3.7 parts of 3,5-diisopropylphenol (described in U.S. Patent 2,790,010, issued April 23, 1957) followed by the addition in several portions of 3.2 parts benzoyl chloride such that the temperature was kept between 20 and 30° C. The oily reaction product was decanted from the aqueous layer and washed with 10% caustic, then water, dried over $CaCl_2$, decolorized with charcoal, passed through activated alumina, and distilled under reduced pressure to give 3,5-diisopropylphenyl benzoate, B.P. (3 mm.) 180° C., F.P. 34.2° C. This material contained 81.10% carbon and 7.61% hydrogen (theory 80.81% and 7.85%).

*Example 2.—The Preparation of Tri-m-Isopropylphenyl Phosphate*

One part reagent grade phosphorus oxychloride and 2.7 parts of m-isopropylphenol were combined in a reaction vessel fitted with a reflux condenser and heated under reflux until evolution of gaseous HCl had ceased. The reactor contents were diluted with an equal quantity of benzene and washed first with 20% caustic and then with water until washings were neutral. The benzene was stripped off, after which the residual liquid was distilled under reduced pressure to give tri-m-isopropylphenyl phosphate, B.P. (2.0 mm.) 238° C., $n_D^{25}$ 1.53509. This material contained 71.57% carbon and 7.21% hydrogen (theory is 71.66% and 7.35%).

*Example 3.—The Preparation of Tri-3,5-Diisopropylphenyl Phosphate*

One part of reagent grade phosphorus oxychloride and 3.5 parts of 3,5-diisopropylphenol were reacted according to the procedure stated for the preparation of tri-m-isopropylphenyl phosphate. The reaction mixture was distilled under reduced pressure to give tri-3,5-diisopropylphenyl phosphate, B.P. (2.0 mm.) 259° C., F.P. 75.6° C. This material contained 74.43% carbon and 8.74% hydrogen. Theory is 74.70% and 8.88%.

*Example 4.—The Preparation of Phenyl-3,5-Diisopropylphenyl Ether*

One hundred parts of bromobenzene, 100 parts of 3,5-diisopropylphenol, 40 parts of potassium hydroxide, and 0.6 part copper powder were combined in a reaction vessel fitted with reflux condenser and heated under reflux overnight. The reactor contents were steam distilled, and the distillation residue was extracted with 10% caustic. The crude oily product layer was then washed with water until washings were neutral and distilled from a simple still to give the product, phenyl-3,5-diisopropylphenyl ether, B.P. 210° to 216° C. at 740 mm., F.P. 38.0° C. This material analyzed for 84.81% carbon and 8.69% hydrogen. Theory is 84.99% and 8.72%.

*Example 5.—The Preparation of Methyl-m-Isopropylphenyl Ether*

One part of sodium hydroxide was dissolved in 6 parts water in a reaction vessel fitted wtih dropping funnel, stirrer, reflux condenser, and cooling bath. Then 3.3 parts of m-isopropylphenol were added. To this mixture was added slowly at room temperature or below 3.0 parts of Eastman Kodak Practical grade methyl sulfate. After the addition was complete the ice bath was replaced by a hot water bath and the mixture was heated at 60° to 70° C. for several hours. The oily reaction product was decanted and water washed until washings were neutral. It was then dried over anhydrous sodium sulfate and distilled to yield methyl-m-isopropylphenyl ether, B.P. (736 mm.) 202.5° C., $n_D^{25}$ 1.50182. This material contained 79.92% carbon and 9.37% hydrogen. Theory is 79.95% and 9.39%.

*Example 6.—The Preparation of Methyl-3,5-Diisopropylphenyl Ether*

One part sodium hydroxide, 6.2 parts water, 4.5 parts 3,5-diisopropylphenol, and 3.2 parts of methyl sulfate were combined and reacted according to the method described for the preparation of methyl-m-isopropylphenol ether. The oily reaction product was decanted, washed with 10% caustic and then with water until washings were neutral, and dried over sodium sulfate. The crude product was diluted with benzene and passed through a column of alumina. The resulting benzene solution was distilled carefully to yield methyl-3,5-diisopropylphenyl ether, B.P. (2.0 mm.) 79° C., $n_D^{25}$ 1.49580. This product contained 81.09% carbon and 10.25% hydrogen. The theory is 81.20% and 10.48%.

*Example 7.—The Preparation of Methyl-2,6-Diisopropylphenyl Ether*

One part sodium hydroxide was dissolved in a small amount (about 0.5 part) of water. This solution in turn was dissolved in 5 parts methanol. To this solution was added 4.3 parts 2,6-diisopropylphenol (Ethyl Corp., Sample 17902). The whole mixture was cooled to below 20° C. with a cold water bath. Three parts methyl sulfate were added in several small portions keeping the temperature below 20° C. After one hour of stirring at room temperature, the mix was brought to reflux and 4 parts methanol were distilled off. The mix was then cooled and the oily product decanted. This was washed with 20% aqueous caustic and with a solution of 20% caustic in 50% methanol-water solution and finally with water until washings were neutral. The oily product was then distilled under vacuum and passed through alumina to give methyl-2,6-diisopropylphenyl ether, B.P. (3.0 mm.) 74° C., $n_D^{25}$ 1.49275. This material contained 81.34% carbon and 10.49% hydrogen. Theory is 81.19% and 10.48%.

*Example 8.—The Preparation of m-Isopropylphenyl Acetate*

One part of m-isopropylphenol and one part of acetic anhydride were combined and slowly distilled. After the acetic acid and acetic anhydride fractions were removed, there was obtained a fraction, B.P. (740 mm.) 235° C. This material was placed in a vessel and heated to between 150° and 200° C. while a current of dry nitrogen was bubbled through the liquid such that about one percent of the liquid was carried over in the nitrogen stream into a trap in one hour. This blowing operation was continued until the vapor stream condensate no longer contained acetic acid or acetic anhydride. There resulted the product m-isopropylphenyl acetate, B.P. (740 mm.) 235° C., $n_D^{25}$ 1.49350, contained 74.36% carbon and 7.84% hydrogen. Theory is 74.13% and 7.92%.

*Example 9.—The Preparation of p-Isopropylphenyl Acetate*

Equal parts of p-isopropylphenol and acetic anhydride were reacted in the same manner described for the preparation of m-isopropylphenyl acetate. The product was purified in the same manner to yield p-isopropylphenyl acetate, B.P. (3.0 mm.) 92° to 93° C., $n_D^{25}$ 1.49350, F.P. 27.5° C., containing 75.56% carbon and 7.91% hydrogen. Theory is 74.13% and 7.92%.

*Example 10.—The Preparation of 2,6-Diisopropylphenyl Acetate*

One part acetic anhydride and 1.1 parts 2,6-diisopropylphenol were reacted in the above manner and purified in the above manner to yield 2,6-diisopropylphenyl acetate, B.P. (736 mm.) 250° C., $n_D^{25}$ 1.49033, F.P. 12.7° C. containing 76.16% carbon and 8.92% hydrogen. Theory is 76.32% and 9.15%.

*Example 11.—The Preparation of m-Isopropylresorcinyl Diacetate*

One part of m-isopropylresorcinol (described in U.S. Patent 2,790,010 issued April 23, 1957) and two parts of acetic anhydride were reacted in the above manner and purified in the above manner to yield m-isopropylresorcinyl diacetate, B.P. (2.0 mm.) 125° C., $n_D^{25}$ 1.49526, containing 66.11% carbon and 6.86% hydrogen. Theory is 66.08% and 6.83%.

*Example 12.—The Preparation of 3,5-Diethylphenyl Acetate*

One part of 3,5-diethylphenol and 1.3 parts of acetic anhydride were reacted in the above manner and purified in the above manner to yield 3,5-diethylphenyl acetate, B.P. (2.0 mm.) 111° C., $n_D^{25}$ 1.49565, containing 75.26% carbon and 8.30% hydrogen. Theory is 74.96% and 8.39%.

*Example 13.—The Preparation of 3,5-Dimethylphenyl Acetate*

One part of 3,5-dimethylphenol and 1.3 parts acetic anhydride were reacted in the above manner and purified in the above manner to yield 3,5-dimethylphenyl acetate, B.P. (743 mm.) 228° C., $n_D^{25}$ 1.49945, containing 73.19% carbon and 7.26% hydrogen. Theory is 73.14% and 7.37%.

Examples 14 through 26 following illustrate the oxidation of the corresponding oxidizable derivatives prepared in Examples 1 through 13. Example 14 is the oxidation of the oxidizable derivative of Example 1; Example 15 is the oxidation of the oxidizable derivative of Example 2, etc. Examples 14 through 26 thus correspond to reaction step (2) of the chain of reactions previously described.

*Example 14.—The Oxidation of 3,5-Diisopropylphenyl Benzoate*

One part of dihydroperoxide of m-diisopropylbenzene and 179 parts of 3,5-diisopropylphenyl benzoate were combined and heated to 150° C. in a reactor for 90 minutes while one liter of dry oxygen was bubbled through the mixture per minute. The oxygen stream passed through the mixture and then into a trap cooled to Dry-Ice temperature so that all non-gaseous effluent was retained in the apparatus. In this way it was shown that 7.0 parts of oxygen were absorbed. Iodimetric analysis of a sample of the product indicated that a net 12.1% gain of hydroperoxide had taken place, corresponding to 2.3 parts of oxygen. This is an oxygen utilization efficiency of 33% to the hydroperoxide.

*Example 15.—The Oxidation of Tri-m-Isopropylphenyl Phosphate*

One part of the dihydroperoxide of m-diisopropylbenzene and 412 parts of tri-m-isopropylphenyl phosphate were combined and heated to 140° C. for 140 minutes and then at 150° C. for 60 minutes while 0.5 liter of dry oxygen was bubbled through the mixture per minute. Off-gas products were trapped as before. In this way 25.6 parts of oxygen were absorbed. Iodimetric analysis of the product indicated that a net 29.0% of the isopropyl groups had reacted to form hydroperoxide groups, corresponding to a consumption of 22.2 parts of oxygen. This is an oxygen utilization efficiency of 87%.

*Example 16.—The Oxidation of Tri-3,5-Diisopropylphenyl Phosphate*

One part m-diisopropylbenzene dihydroperoxide and 960 parts of tri-3,5-diisopropylphenyl phosphate were combined and oxidized at 150° C. for 112 minutes with an oxygen flow of 0.5 liters per minute. Off-gas condensate was trapped as before. In this way 24.8 parts of oxygen were absorbed, of which 23.2 parts were accountable by iodimetric titration, which indicated a net of 18.9% hydroperoxide gain. This is an oxygen efficiency of 94%.

*Example 17.—The Oxidation of Phenyl-3,5-Diisopropylphenyl Ether*

One part of m-diisopropylbenzene dihydroperoxide and 47 parts of phenyl-3,5-diisopropylphenyl ether were combined and oxidized as before for one hour at 140° C. with an oxygen flow of one liter per minute. There was an increase of 2.7 parts oxygen and iodimetric analysis indicated that there was a net 43.5% gain of hydroperoxide. 2.3 parts of oxygen are thus accountable as hydroperoxide. This is an efficiency of 85%.

Example 18.—The Oxidation of Methyl-m-Isopropylphenyl Ether

Twenty-five parts of methyl-m-isopropylphenyl ether were oxidized without catalysis at 150° C. and 0.5 liter per minute of oxygen flow for 90 minutes. There was an increase of one part oxygen, and iodimetric analysis indicated the presence of 0.69 parts oxygen due to hydroperoxide, present to the extent of 15.2%. This is an efficiency of 69%.

Example 19.—The Oxidation of Methyl-3,5-Diisopropylphenyl Ether

One part of m-diisopropylbenzene dihydroperoxide and 222 parts of methyl-3,5-diisopropylphenyl ether were combined and oxidized at 140° C. for 78 minutes at 0.5 liter per minute flow of dry oxygen. There was picked up 12.1 parts oxygen, and iodimetric analysis indicated that a net gain of 31.1% hydroperoxide had occurred, which corresponds to 10.6 parts of oxygen. Thus the oxygen efficiency was 88%.

Example 20.—The Oxidation of Methyl-2,6-Diisopropylphenyl Ether

One part m-diisopropylbenzene dihydroperoxide and 38.5 parts methyl-2,6-diisopropylphenyl ether were combined and oxidized at 160° C. for 150 minutes with an oxygen flow of 0.5 liter per minute. There was an increase of 0.76 part of oxygen, and the product was titrated iodimetrically to an indicated 0.16% net hydroperoxide increase. This corresponds to 0.011 part oxygen, or an oxygen efficiency of 1.4%.

Example 21.—The Oxidation of m-Isopropylphenyl Acetate m-Isopropylphenyl acetate (18.5 parts) was oxidized without catalysis for 255 minutes at 150° C. with 0.5 liter per minute flow of dry oxygen. One part of oxygen was thus absorbed to give a product titrating iodimetrically for 29.2% hydroperoxide. The amount of oxygen accountable as hydroperoxide was therefore 0.86 part. This is an oxygen efficiency of 86%.

Example 22.—The Oxidation of p-Isopropylphenyl Acetate

A mixture of 12.5 parts p-isopropylphenyl acetate and one part of an oxidate of m-isopropylphenyl acetate containing 29% hydroperoxide was prepared. This contained 2% hydroperoxide. 16.5 parts of this mixture were oxidized at 160° C. with 0.5 liter per minute dry oxygen flow for 120 minutes. There was a weight gain of one part oxygen, and the product titrated iodimetrically to show a net 27.5% hydroperoxide gain, corresponding to 0.73 part oxygen. Thus an oxygen efficiency of 73% was obtained.

Example 23.—The Oxidation of 2,6-Diisopropylphenyl Acetate

Twenty parts 2,6-diisoproylphenyl acetate were combined with one part of an oxidate of m-diisopropylbenzene which contained 88% hydroperoxide, making a solution titrating for 4% hydroperoxide. 70.4 parts of this solution was oxidized for 2 hours at 150° C. and then for 90 minutes at 180° C. with an oxygen flow of 0.4 liter per minute. There was a weight increase of one part oxygen. Iodimetric titration indicated a net increase of one percent hydroperoxide corresponding to 0.09 part oxygen. This is an oxygen efficiency of 8.8%.

Example 24.—The Oxidation of m-Isopropylresorcinyl Diacetate

Twenty parts m-isopropylresorcinyl diacetate and one part of an oxidate of m-isopropylresorcinyl diacetate containing 25% hydroperoxide were combined to give a mixture containing one percent hydroperoxide. 14.3 parts of this mixture were oxidized at 160° C. for 75 minutes with an oxygen flow of one liter per minute. There was a weight increase of one part of oxygen. The product titrated iodimetrically for a net of 40.4% hydroperoxide gain corresponding to 0.74 part oxygen. This is an oxygen efficiency of 74%.

Example 25.—The Oxidation of 3,5-Diethylphenyl Acetate

One part of an oxidate of m-diisopropylbenzene which contained 88% hydroperoxide and 26.7 parts 3,5-diethylphenyl acetate were combined to give a solution containing one percent hydroperoxide. 15.2 parts of this mixture were oxidized at 150° C. and 0.5 liter per minute flow of dry oxygen for 135 minutes. There was a total gain of one part oxygen, and the product titrated iodimetrically to show a net 20.7% hydroperoxide increase. This corresponds to 0.48 part oxygen, and therefore to an oxygen efficiency of 48%.

Example 26.—The Oxidation of 3,5-Dimethylphenyl Acetate

One part of an oxidate of m-diisopropylbenzene which contained 88% hydroperoxide and 25 parts 3,5-dimethylphenyl acetate were combined to give a solution titrating for 3% hydroperoxide. 56.5 parts of this mixture were oxidized at 160° C. and 0.5 liter of dry oxygen per minute flow for 4 hours. There was a total gain of one part oxygen, and the product titrated iodimetrically for 0.5% net hydroperoxide increase. This corresponds to 0.05 part oxygen, and therefore to an oxygen efficiency of 5%.

Example 27 following illustrates the cleavage of the hydroperoxide of m-isopropylphenyl acetate, corresponding to reaction step (3) of the chain of reactions. This example is set forth to illustrate the object of synthesizing ketones.

Example 27.—The Cleavage of m-Isopropylphenyl Acetate Oxidate

One part of the m-isopropylphenyl acetate oxidate such as prepared in Example 21 which contained 41.8% hydroperoxide by iodimetric titration was combined with one part m-isopropylphenol and one part of a solution of m-isopropylphenol containing 0.3% sulfuric acid.

This mixture, in a suitable reaction vessel, was allowed to react at 55° to 65° C. for five minutes. The reaction temperature was controlled by means of a water bath. When the reaction was completed the mixture was analyzed for acetone by a standard hydroxylamine procedure. In this way the product was shown to contain 10.2% acetone, which indicated that the hydroperoxide present in the oxidate cleaved to yield acetone in an efficiency of 89%.

Examples 28 to 30 following illustrate the bulk cleavage and hydrolysis of alkylated phenyl acetate oxidates corresponding to reaction steps (3) and (4) of the chain of reactions. Oxidates of three alkylated phenyl acetates such as prepared in Examples 21, 22 and 24 respectively were cleaved in bulk and the phenolic products isolated according to the following schemes.

Example 28.—The Bulk Cleavage of m-Isopropylphenyl Acetate Oxidate

Ten parts of m-isopropylphenyl acetate oxidate containing 31.1% hydroperoxide was diluted with ten parts acetone containing 0.2% sulfuric acid. This mixture was heated under reflux for one-half hour in order to cleave the hydroperoxide present (reaction step 3). The acetone was distilled off under vacuum, after which the residue was dissolved in benzene and extracted with 10% caustic at 10° C. The caustic extract was heated to boiling for one hour under a blanket of nitrogen (reaction step 4) after which it was cooled and acidified with HCl. The acidified solution was extracted with an equal volume of ethyl ether. Evaporation to dryness of the ether solution yielded 1.4 parts (86% yield) of crude resorcinol. Recrystallization twice from benzene gave pure resorcinol as white needles, M.P. 108° to 110° C., identified by mixed melting point with an authentic sample.

*Example 29.—The Bulk Cleavage of p-Isopropylphenyl Acetate Oxidate*

Eleven parts of p-isopropylphenyl acetate oxidate containing 26.8% hydroperoxide was mixed with 6.1 parts of a solution of 3% sulfuric acid in glacial acetic acid. This mixture reacted spontaneously and temperature rose to 90° C. before subsiding. The acetic acid was stripped off under reduced pressure, and the residual mixture was taken up in benzene and extracted with 10% caustic. The caustic layer was acidified with HCl and extracted with ethyl ether. Evaporation of the ether solution to dryness gave a crystalline mass which yielded, on recrystallization twice from chlorobenzene and once from water, one part of pure hydroquinone as fine needles, M.P. 169.0° to 170.5° C. This is a 65% yield. The needles were identified by mixed melting point with an authentic sample.

*Example 30.—The Bulk Cleavage of m-Isopropylresorcinyl Diacetate Oxidate*

Two parts of an m-isopropylresorcinyl diacetate oxidate containing 35.6% hydroperoxide were mixed with one part of a solution of 0.6% sulfuric acid in glacial acetic acid. This mixture was allowed to react at 65° to 70° C. in a water-cooled reactor for 20 minutes. After the acetic acid had been stripped off under reduced pressure, the residue was taken up in benzene and extracted with 10% caustic. The caustic solution was acidified with HCl and extracted with ethyl ether. The ether solution, on evaporation to dryness, gave a residue which, on recrystallization twice from water, yielded the dihydrate of phloroglucinol. This hydrate was dehydrated by vacuum sublimation to give a 25.6% yield of phloroglucinol, M.P. 210.0° to 212.0° C., identified by mixed melting point with an authentic sample.

The following examples illustrate other syntheses via oxidate cleavages.

*Example 31.—Cleavage of Oxidate of 3,5-Diisopropylphenyl Benzoate*

The oxidate of 3,5-diisopropylphenyl benzoate is cleaved according to the procedure given for m-isopropylresorcinyl diacetate oxidate. The caustic extract is heated to reflux before acidification with HCl and extraction with ether. The ether solution is then evaporated to dryness to give a residue which on recrystallization several times from benzene yields pure, crystalline m-isospropylresorcinol, M.P. 110° to 112° C.

*Example 32.—Cleavage of Oxidate of Tri-m-Isopropylphenyl Phosphate*

The oxidate of tri-3,5-diisopropylphenyl phosphate is cleaved and hydrolyzed according to the above procedure. The resorcinol is then isolated as a semicrystalline mass which, on recrystallization several times from benzene, gives this compound as fine white needles, M.P. 108° to 110° C.

*Example 33.—Cleavage of Oxidate of Tri-3,5-Diisopropylphenyl Phosphate*

The oxidate of tri-3,5-dissopropylphenyl phosphate is cleaved and hydrolyzed after the fashion of tri-m-isopropylphenyl phosphate oxidate. The m-isopropylresorcinol is then isolated in the crude state and purified as indicated in its preparation from 3,5-diisopropylphenyl benzoate oxidate. m-Isopropylresorcinol is prepared in good yield in this way as fine, almost white crystals, M.P. 110° to 112° C.

*Example 34.—Cleavage of Oxidate of Phenyl-3,5-Diisopropylphenyl Ether*

The oxidate of phenyl-3,5-diisopropylphenyl ether is cleaved according to the procedure described for m-isopropylresorcinyl diacetate oxidate. The resulting phenolic phenyl ether is cleaved according to the procedure of Prey (Ber. 76B, p. 156, 1943), and crude m-isopropylresorcinol is obtained which is easily recrystallizable from benzene to yield white crystals, M.P. 110° to 112° C.

*Example 35.—Cleavage of Oxidate of Methyl m-Isopropylphenyl Ether*

The oxidate of methyl-m-isopropylphenyl ether is cleaved according to the above described procedure. The resulting phenolic methyl ether is cleaved either according to the procedure of Prey or by heating with concentrated hydroiodic acid. A semicrystalline mass of crude resorcinol is obtained which yields resorcinol in good purity either by recrystallization from benzene or by vacuum distillation.

*Example 36.—Cleavage of Oxidate of Methyl-3,5-Diisopropylphenyl Ether*

The oxidate of methyl-3,5-diisopropylphenyl ether is reacted in the previously described manner to yield the methyl ether. The methyl ether is further cleaved in the described manner to yield, after recrystallization from benzene, fine white crystals of m-isopropylresorcinol, M.P. 110° to 112° C.

*Example 37.—Cleavage of Oxidate of 3,5-Diethylphenyl Acetate*

The oxidate of 3,5-diethylphenyl acetate is cleaved and the reaction product worked up in the manner described for m-isopropylresorcinyl diacetate oxidate. The ether extract thus obtained is evaporated to dryness and the residue vacuum distilled. The crude product is then recrystallized from a mixture of benzene and petroleum ether and vacuum sublimed to yield white needles of 5-ethylresorcinol, M.P. 93° to 94° C.

*Example 38.—Cleavage of Oxidate of 3,5-Dimethylphenyl Acetate*

The oxidate of 3,5-dimethylphenyl acetate is reacted and worked up in the manner described for m-isopropylresorcinyl diacetate oxidate to yield a crude product which when recrystallized from a mixture of benzene and petroleum ether and vacuum sublimes to yield 5-methylresorcinol, M.P. 107° to 108° C.

It is to be understood that the invention is not limited to the specific examples which have been offered merely as illustrative and that modifications may be made within the scope of the appended claims without departing from the spirit of the invention.

I claim:

1. The process of producing polyhydroxy aromatic compounds which comprises: (1) reacting an alkyl substituted aromatic hydroxyl compound selected from the group consisting of alkyl substituted hydroxy phenyl and alkyl substituted polyhydroxy phenyl, wherein the alkyl group contains a hydrogen atom alpha to the aromatic ring with a material selected from the group consisting of phosphorus oxychloride, phosphoric acid, phosphorus pentoxide, aliphatic anhydrides, aromatic anhydrides, aliphatic acid halides, aromatic acid halides, aliphatic acids, aromatic acids, mixtures of dimethyl sulphate and sodium hydroxide, mixtures of alkali metal hydroxides with aromatic halides, and mixtures of alkali metal hydroxides with aliphatic halides, which reacts with the hydroxyl constituent of said alkyl substituted aromatic hydroxyl compound and which converts the alkyl substituted aromatic hydroxyl compound into a compound selected from the group consisting of alkyl substituted aromatic phosphates, ethers and esters; (2) reducing the presence of unreacted alkyl substituted aromatic hydroxyl compound to less than one percent; (3) oxidizing the resultant product at the alkyl constituent to replace the alpha hydrogen with a hydroperoxide group; and (4) cleaving said peroxidized compound to a polyhydroxy aromatic compound possessing hydroxy constituents at the sites on the aromatic ring originally occupied by the hydroxyl constituent and the alkyl group with the alpha hydrogen constituent.

2. The process of claim 1 wherein the starting alkyl substituted aromatic hydroxyl compound is meta-isopropylphenol and the final polyhydroxy aromatic compound obtained is resorcinol.

3. The process of claim 1 wherein the starting alkyl substituted aromatic hydroxyl compound is meta-isopropylresorcinol and the final polyhydroxy aromatic compound obtained is phloroglucinol.

4. The process of claim 1 wherein the starting alkyl substituted aromatic hydroxyl compound is para-isopropylphenol and the final polyhydroxy aromatic compound obtained is hydroquinone.

5. The process of claim 1 wherein the starting alkyl substituted aromatic hydroxyl compound is 3,5-diisopropylphenol and the final polyhydroxy aromatic compound obtained is meta-isopropylresorcinol.

6. The process of claim 1 wherein the starting alkyl substituted aromatic hydroxyl compound is 3,5-diethylphenol and the final polyhydroxy aromatic compound obtained is meta-ethylresorcinol.

7. The process of producing esters, ethers and phosphates of polyhydroxy aromatic compounds which comprises: (1) reacting an alkyl substituted aromatic hydroxyl compound selected from the group consisting of alkyl substituted hydroxy phenyl and alkyl substituted polyhydroxy phenyl, wherein the alkyl group contains a hydrogen atom alpha to the aromatic ring with a material selected from the group consisting of phosphorus oxychloride, phosphoric acid, phosphorus pentoxide, aliphatic anhydrides, aromatic anhydrides, aliphatic acid halides, aromatic acid halides, aliphatic acids, aromatic acids, mixtures of dimethyl sulphate and sodium hydroxide, mixtures of alkali metal hydroxides with aromatic halides, and mixtures of alkali metal hydroxides with aliphatic halides, which reacts with the hydroxyl constituent of said alkyl substituted aromatic hydroxyl compound and which converts the alkyl substituted aromatic hydroxyl compound into a compound selected from the group consisting of alkyl substituted aromatic phosphates, ethers and esters; (2) reducing the presence of unreacted alkyl substituted aromatic hydroxyl compound to less than one percent; (3) oxidizing the resultant product at the alkyl constituent to replace the alpha hydrogen with a hydroperoxide group; and (4) cleaving said peroxidized compound to a compound selected from the group consisting of aromatic phosphates, ethers and esters and possessing a hydroxy constituent at the site on the aromatic ring originally occupied by the alkyl group with the alpha hydrogen constituent.

References Cited in the file of this patent

UNITED STATES PATENTS

| 2,671,809 | Fortuin et al. | Mar. 9, 1954 |
| 2,799,695 | Taves | July 16, 1957 |
| 2,799,698 | Taves | July 16, 1957 |

OTHER REFERENCES

Maley et al.: "J. Am. Chem. Soc.," 78, 5303–7 (1956).